US011494770B1

(12) United States Patent
Gross et al.

(10) Patent No.: US 11,494,770 B1
(45) Date of Patent: Nov. 8, 2022

(54) SYSTEMS AND METHODS FOR PREFERRING PAYMENTS USING A SOCIAL BACKGROUND CHECK

(71) Applicant: Wells Fargo Bank, N.A., San Francisco, CA (US)

(72) Inventors: Thomas E. Gross, San Anselmo, CA (US); Kimarie Matthews, San Francisco, CA (US); Darius A. Miranda, San Francisco, CA (US); Matthew P. Schlachtman, San Francisco, CA (US); Edward P. Scholtens, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 15 days.

(21) Appl. No.: 17/243,223

(22) Filed: Apr. 28, 2021

Related U.S. Application Data

(63) Continuation of application No. 15/392,611, filed on Dec. 28, 2016, now Pat. No. 10,997,595.

(51) Int. Cl.
*G06Q 20/40* (2012.01)
*G06Q 50/00* (2012.01)
*G06F 16/28* (2019.01)

(52) U.S. Cl.
CPC ....... *G06Q 20/4014* (2013.01); *G06F 16/284* (2019.01); *G06Q 20/4016* (2013.01); *G06Q 50/01* (2013.01)

(58) Field of Classification Search
CPC .................................................. G06Q 50/01
(Continued)

(56) References Cited

U.S. PATENT DOCUMENTS 8,249,985 B2  8/2012 Giordano et al.
8,386,353 B2  2/2013 Hirson et al.
(Continued)

FOREIGN PATENT DOCUMENTS

WO  WO-2012/083093 A1  6/2012
WO  WO-2012/097171 A3  7/2012

OTHER PUBLICATIONS

Almendra, "Finding the Needle: A risk-based ranking of product listings at online auction sites for non-delivery fraud prediction", Expert Systems with Applications, v 40, n 12, 4805-11, Sep. 15, 2013. 3 pages.

(Continued)

*Primary Examiner* — Cho Kwong
(74) *Attorney, Agent, or Firm* — Foley & Lardner LLP

(57) ABSTRACT

Systems and methods are described for facilitating payments and transactions using social background checks. Such systems and methods may use social networks with both individual members communicating over a network to a social authentication computing system. The authentication of transactions associated financial institutions are determined through the use of relationship measures based on social media interactions. Transactions and services available to a user are determined based on a measure of social identity through the use of social media platforms. Available contact and interaction data from one or more social media platforms is leveraged to analyze a level of trust that a transaction is not a consequence of fraudulent activity. Transactions that have a low level of risk of being a consequence of fraudulent activity are benefited through faster transaction times and other improvements.

20 Claims, 4 Drawing Sheets

(58) Field of Classification Search
USPC .......................................................... 705/44
See application file for complete search history.

(56) References Cited

U.S. PATENT DOCUMENTS

| | | | |
|---|---|---|---|
| 8,560,436 | B2 | 10/2013 | Ingram et al. |
| 8,769,304 | B2 | 7/2014 | Kirsch |
| 8,909,771 | B2 | 12/2014 | Heath |
| 9,111,281 | B2 | 8/2015 | Stibel et al. |
| 9,112,875 | B2 | 8/2015 | Zaid et al. |
| 9,159,058 | B2 | 10/2015 | Fleishman et al. |
| 9,191,370 | B2 | 11/2015 | Barber et al. |
| 9,264,880 | B2 | 2/2016 | Walsh et al. |
| 9,754,254 | B2 | 9/2017 | Bayer et al. |
| 2008/0109244 | A1 | 5/2008 | Gupta |
| 2009/0182664 | A1 | 7/2009 | Trombley |
| 2011/0004547 | A1 | 1/2011 | Giordano et al. |
| 2011/0010293 | A1 | 1/2011 | Giordano et al. |
| 2012/0130863 | A1 | 5/2012 | Tedjamulia et al. |
| 2012/0158589 | A1 | 6/2012 | Katzin et al. |
| 2012/0209749 | A1 | 8/2012 | Hammad et al. |
| 2012/0295580 | A1 | 11/2012 | Corner |
| 2013/0024371 | A1 | 1/2013 | Hariramani et al. |
| 2013/0226804 | A1 | 8/2013 | Weiss |
| 2013/0332357 | A1* | 12/2013 | Green .................. G06Q 20/384 705/44 |
| 2014/0067462 | A1 | 3/2014 | Korosec et al. |
| 2014/0081750 | A1 | 3/2014 | Hosp |
| 2014/0244476 | A1 | 8/2014 | Shvarts et al. |
| 2014/0279531 | A1 | 9/2014 | Levkovitz et al. |
| 2014/0282977 | A1 | 9/2014 | Madhu et al. |
| 2015/0012442 | A1 | 1/2015 | Ceribelli et al. |
| 2015/0088754 | A1 | 3/2015 | Kirsch |
| 2015/0106216 | A1 | 4/2015 | Kenderov |
| 2015/0142545 | A1 | 5/2015 | Ceribelli et al. |
| 2015/0142643 | A1 | 5/2015 | Ceribelli et al. |
| 2015/0161610 | A1 | 6/2015 | Sahadevan et al. |
| 2015/0278783 | A1 | 10/2015 | Wantz, II et al. |
| 2015/0348166 | A1 | 12/2015 | Trivedi et al. |
| 2016/0012427 | A1 | 1/2016 | Van Heerden et al. |
| 2016/0071105 | A1 | 3/2016 | Groarke et al. |
| 2016/0247132 | A1 | 8/2016 | Zamer |
| 2017/0161745 | A1 | 6/2017 | Hawkins |

OTHER PUBLICATIONS

Lin et al., "Modeling trader reputation distribution in an online customer-to-customer auction market", IRMA 2002, Oct. 15, 2011. 6 pages.

Mashima, Daisuke, "Using Identity Credential Usage Logs to Detect Anomalous Service Accesses", Proceedings of the ACM Conference on Computer and Communications Security, p. 73-79, 2009, Proceedings of the 5th ACM Workshop on Digital Identity Management, DIM '09, Co-located with the 16th ACM Computer and Communications Security Conference, CCS'09.

Otsuki et al., "ICT Risk Rating of E-Commerce", 8th Electrical Engineering/Electronics, Computer, Telecommunications and Information Technology, Conference 2011. 4 pages.

* cited by examiner

SYSTEMS AND METHODS FOR PREFERRING PAYMENTS USING A SOCIAL BACKGROUND CHECK

CROSS-REFERENCE TO RELATED PATENT APPLICATIONS

This application is a Continuation of U.S. patent application Ser. No. 15/392,611 filed on Dec. 28, 2016, the entire disclosure of which is hereby incorporated by reference herein.

BACKGROUND

The proliferation of the internet has fundamentally changed various aspects of individuals' lives, such as communication, work, education, finance, social and personal relationships, etc. For example, the internet has remarkably increased the amount of information available and decreased the transaction cost of obtaining such information. In addition, the internet has enabled a wider range of individuals to meet and interact and form social groups online with extensions to offline groups and activities. Such social networks can be formed for a variety of reasons and can be based on a shared interest, characteristic, or identification of the members of the social network. Interactions between members of social networks can take many forms and include private communication, public communication, sharing of content, tagging of members to content, and the like. Members develop one or more social identities that are associated with various factors related to use of and interaction with the social networks.

SUMMARY

One embodiment relates to a computer-implemented method. The method comprises receiving a request for a transaction from a first party to a second party. Once the request is received a relationship measure is determined between the first party and the second party by first receiving a plurality of social media associations between the first party and the second party and then basing the determination on a number and type of the plurality of social media associations. A parameter can be adjusted that is associated with the transaction based on the relationship measure exceeding a threshold value. Finally, the transaction is initiated from the first party to the second party using the adjusted parameter.

In some embodiments, the method further comprises determining a social identity score for the first party based on at least a number and type of social media content created by the first party and determining the availability of the type of the transaction that was requested based on the social identity score. If the type of transaction is available based on the social identity score, a confirmation of the availability is transmitted.

In some embodiments, the method further comprises determining the relationship measure by weighting the relationship measure by a factor selected from a group consisting of a value associated with one or more of the type of the plurality of social media associations, a frequency of the plurality of social media associations, a length of time the first party and the second party have been associated on one or more social media platforms, and a number of shared connections between the first party and the second party.

In some embodiments, the parameter in the method is selected from a group consisting of a time of completion of the transaction, a value of funds authorized for the transaction, a fee associated with the transaction, and an exchange rate associated with the transaction.

In some embodiments, the method further comprises determining the relationship measure does not exceed a second threshold value and transmitting a request for additional authentication based on the relationship measure does not exceed the second threshold value. The second threshold value may be a different value than the threshold value. The request for additional authentication may be a request for data selected from a group consisting of financial information associated with an account of the first party, financial information associated with an account of the second party, a social identity score of the second party, and data received from one or more sensors of a computing device associated with the first party.

Another embodiment relates to a system comprising a network interface circuit and a financial transaction circuit configured for executing the method described above.

Another embodiment relates to a non-transitory computer-readable media having computer-executable instructions embodied therein that, when executed by one or more processors of a computing system, cause the one or more processors to perform the operations of the method described above.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring generally to the figures, systems and methods facilitating payments and transactions using social background checks are shown. Such systems and methods may use social networks with two or more participants of a transaction communicating over a network (e.g., the internet). In some embodiments, financial institutions use social authentication systems that communicate over the network with the social networks to facilitate transactions between the individual members of the social network(s). Individual components of the systems can be one or more of the various systems described. In some embodiments, the social authentication computing system, on its own, or running as part of social network computing system and/or a financial institution computing system facilitates embodiments of the methods described. In addition, embodiments described herein solve the technical and internet-centric problem of facilitating authentication of transactions associated with financial institutions through the use of relationship measures based on social media interactions. The embodiments described herein also solve the technical and internet-centric problem of determining transactions and services available to a user based on a measure of social identity through the use of social media platforms. This is addressed by leveraging available contact and interaction data from one or more social media platforms to analyze a level of trust that a transaction is not a consequence of fraudulent activity. Transactions that have a low level of risk of being a consequence of fraudulent activity can be initiated more quickly without the need of additional verification or confirmation information and the amount of time to complete the transaction itself can be reduced. This provides a technical solution of providing systems and methods to facilitate payments and transactions using social background checks.

Figure 1:
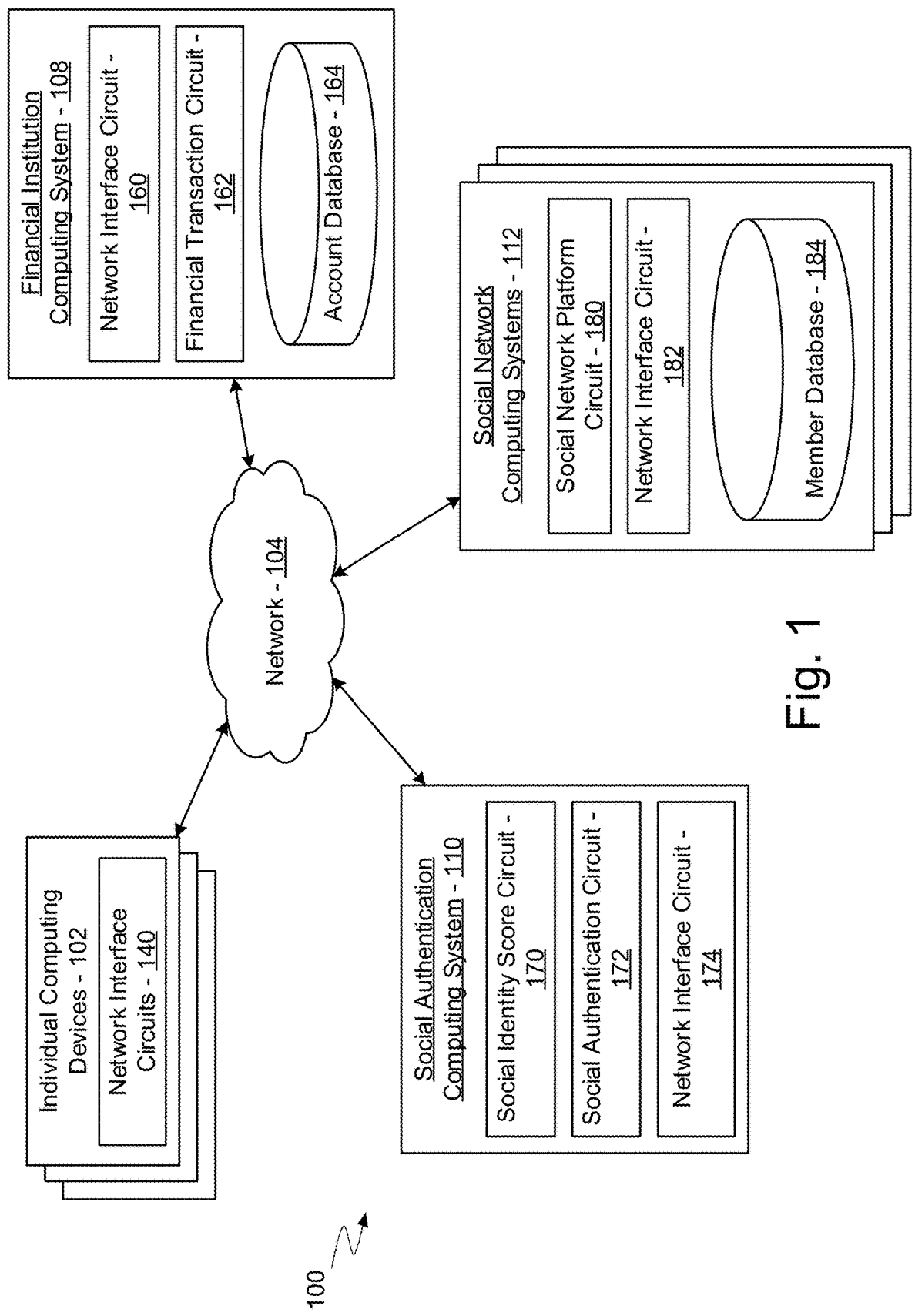
FIG. 1 is a block diagram of an environment for facilitating payments and transactions using social background checks according to an example embodiment.

Referring now to FIG. 1, a block diagram of an environment 100 for facilitating payments and transactions using social background checks according to an example embodiment is depicted. In brief overview, the environment 100 includes one or more individual computing devices 102 used by users with financial accounts with financial institutions connected to a network 104. Also connected to the network 104 are a financial institution computing system 108, a social authentication computing system systems 110, and a social network computing system 112. The financial institution computing system 108 is affiliated with a financial institution, such as a bank. In some embodiments, the individual computing devices 102 communicate over the network 104 to the financial institution computing system 108. The individual computing devices 102 are smartphones, laptop computers, tablet computers, e-readers, smartwatches, and the like. In some embodiments, the social authentication computing system 110 also communicate over the network 104 to the financial institution computing system 108 and the social network computing systems 112. In reference to components described herein, references to the components in singular or in plural form are not intended as disclaimers of alternative embodiments unless otherwise indicated. The components are configured to interact, in some embodiments, as described in further detail below.

In the environment 100, data communication between the individual computing devices 102, the financial institution computing system 108, the social authentication computing system 110, and the social network computing systems 112 in various combinations are facilitated by the network 104. In some embodiments, the network 104 includes the internet. In other embodiments or combinations, the network 104 includes a local area network or a wide area network. The network 104 is facilitated by short and/or long range communication technologies including Bluetooth® transceivers, Bluetooth® beacons, RFID transceivers, NFC transceivers, Wi-Fi transceivers, cellular transceivers, wired network connections (e.g., Ethernet), etc. In some other embodiments, particularly for communication between the financial institution computing system 108 and the social authentication computing system 110 and/or the social network computing system 112, the network 104 may comprise an interbank network (e.g., Maestro, NYCE®, PLUS, Cirrus, STAR, etc.) including a plurality of member financial institutions enabling customers of a first interbank network member to perform transactions by systems owned or operated by a second interbank network member.

Still referring to FIG. 1, the individuals using individual computing devices 102 are in communication with and/or have accounts with a financial institution associated with the financial institution computing system 108. In some embodiments, individual computing devices 102 are mobile computing devices such as smartphones, laptop computers, tablet computers, e-readers, smartwatches, and the like. The individual computing devices 102 as depicted include network interface circuits 140. Data passing through the network interface circuits 140 can be encrypted such that the network interface circuits 140 are secure communication modules. In some embodiments, the network interface circuits 140 comprise one or more Bluetooth® transceivers, RFID transceivers, NFC transceivers, Wi-Fi transceivers, cellular transceivers, and the like.

The financial institution computing system 108 is associated with a financial institution (e.g., a bank, a credit card issuer, etc.). The financial institution computing system 108 includes a network interface circuit 160, a financial transaction circuit 162, and an account database 164. In some embodiments, the network interface circuit 160 comprises one or more Bluetooth® transceivers, RFID transceivers, NFC transceivers, Wi-Fi transceivers, cellular transceivers, and the like. In some embodiments, the financial transaction circuit 162 and/or the account database 164 reside in part on different computing devices or systems (e.g., in the individual computing device 102, the social authentication computing system 110, or the social network computing system 112) in relation to other components or to the whole of a particular component. Data passing through the network interface circuit 160 may be encrypted such that the network interface circuit 160 is a secure communication module. In some arrangements, the network interface circuit 160, financial transaction circuit 162, and the account database 162 reside in part on different servers in relation to other components or to the whole of a particular component.

In some embodiments, the financial transaction circuit 162 is configured to control at least some operations of the financial institution computing system 108 using data stored in databases or other computer storage structures, such as the account database 164. The financial transaction circuit 162 is configured to facilitate payments and transactions using social background checks by analyzing and providing additional information on the financial data of one or more parties of the payment or transaction. Financial data can include credit scores, liquid asset positions, liquidity ratio (e.g., liquid assets/monthly expenses), asset to debt ratio (e.g., total assets/total liabilities), current ratio (e.g., liquid assets/short term liabilities), debt service ratio (e.g., short term liabilities/total income), saving ratio (e.g., monthly surplus once recurring liabilities paid), set monthly costs, expenditure volatility, and the like.

In some embodiments, the account database 164 is configured to store information related to account information (e.g., account numbers, account types, account balances, transaction history, ownership information, owner contact information, etc.) and/or profiles of individuals using the social authentication computing system 110. In some embodiment, historical financial transaction information between one or more individuals are stored in the account database 164.

The social authentication computing system 110 is a computing system configured to run applications and other software and communicate with other computing systems over a network 104. In some embodiments, the social authentication computing system 110 is a server. In some embodiments, the social authentication computing system 110 includes a social identity score circuit 170, a social authentication circuit 172, and a network interface circuit 174. In some embodiments, the network interface circuit 174 comprises one or more Bluetooth® transceivers, RFID transceivers, NFC transceivers, Wi-Fi transceivers, cellular transceivers, and the like. In some embodiments, the social identity score circuit 170 and/or the social authentication circuit 172 reside in part on different computing devices or systems (e.g., in the individual computing device 102, the social network computing systems 112, or the financial institution computing system 108) in relation to other components or to the whole of a particular component. Data passing through the network interface circuit 174 may be encrypted such that the network interface circuit 174 is a secure communication module.

In some embodiments, the social identity score circuit 170 is configured to identify a measure of social identity for one or more parties involved in a financial transaction or service. In some embodiments, the measure of social identity is a social identity score associated with a customer an account at a financial institution associated with a financial institution computing system 108. In some embodiments, the social identity score circuit 170 is configured to base the measure of social identity on one or more of a number and type of transactions on social media platforms (e.g., operating on a social network computing system 112), frequency of original posts, articles, videos, etc. by the user, frequency of sharing content of others by the user, number of approval indicators (e.g., 'likes') associated with the user, frequency of accessing content on one or more social media platforms, number of shared connections (e.g., 'friends') of the user, amount of time active on one or more social media platforms, and the like. The social identity score circuit 170 may be further configured to further validate the data associated with the number and type of transactions through confirmation from other data sources. In some embodiments, the social identity score circuit 170 is configured to further validate the data associated with the number and type of social media transactions against public records (e.g., government records, school records, other social media profiles, etc.).

In some embodiments, the social identity score circuit 170 is configured to determine one or more services that are available based on the measure of social identity. In some embodiments, the social identity score circuit 170 limits the one or more services that are available based on the measure of social identity. For example, a low social identity score may indicate that the user has a newly opened account on the one or more social media platforms and does not have sufficient history to allow access to the one or more services that are available. In some embodiments, available services include one or more of peer to peer funds transfer, account to account funds transfer, depositing of checks, short term loan applications, and the like.

In some embodiments, the social authentication circuit 172 is configured to reduce the authentication requirements based on a measure of social identity. In some embodiments, the social authentication circuit 172 is configured to reduce requirements based on obtained financial information associated with an account of the initiating party (e.g., a credit card number and expiration date). In some embodiments, the social authentication circuit 172 is configured to reduce authentication requirements based on a relationship measure between the one or more parties engaged in a transaction. In some embodiments, the social authentication circuit 172 is configured to reduce the authentication requirements based on the previous transaction history between the two or more parties. In some embodiments, the social authentication circuit 172 is configured to determine a level of trust based on the relationship measure being above a threshold relationship measure. Different threshold relationship measures may correspond to a different levels of trust and accordingly require decreasing amounts of additional authentication. In some embodiments, the social authentication circuit 172 is configured to assign the threshold relationship measures to differing values for a maximum currency amount that can be part of the transaction. In some embodiments, the social authentication circuit 172 is configured to obtain further authentication through the use of financial information associated with an account of one or more of the parties (e.g., a credit card number and expiration date). In some embodiments, the social authentication circuit 182 is configured to mitigate a low relationship measure by accessing or receiving additional information about the social media use of the potential receiving party. Additional information may be available to determine a measure of social identity of the receiving party (e.g., by the social identity score circuit 170) and a threshold level determines the receiving party is not a fake or fraudulent identity.

In some embodiments, the social authentication circuit 172 is configured to receive additional authentication data from one or more sensors of an individual computing device 102 used by the party to initiate the transaction. For example, the additional authentication data may comprise biometric information obtained from the one or more sensors such as a finger print, thumb print, hand print, or any print of the body, facial image obtained by camera components or sensors, an eye image (iris or retina) obtained by camera components or sensors, a vocal sample, captured gait information (e.g., through the use of accelerometers), hand geometry information, thermogram data, skin reflection data, infrared sensor data, etc. In some embodiments, the transaction is authenticated through the use of two-factor authorization through communication with the individual computing device 102. In some embodiments, the social authentication circuit is configured to received additional authentication data from a sensor or touchscreen of an individual computing device 102 to facilitate authentication such as a gesture pattern on the individual computing device 102 (i.e., hand pattern, individual computing device 102 movement pattern, keypad entry pattern, etc.), a security image recognizable by the user, a vibrational pattern on the individual computing device 102, and the like. The authentication information may be captured by the individual user device 102 or a sensor device connected to the individual user device 102.

The social network computing systems 112 are computing systems configured to run applications and other software and communicate with other computing systems over a network 104. In some embodiments, the social network computing systems 112 are servers. The social network computing systems 112 are configured to provide one or more social networking accounts to each of their members, including users of the individual computing devices 102. In some embodiments, the social networking accounts enable each respective member to create a representation of the member (e.g., a member profile), share connections with other members of the social network, and view and interact with shared content and media associated with the connections with other members. The social network computing system 112 also maintains (e.g., stores, updates, etc.) information associated with each respective member's social networking account. In some embodiments, the social network computing systems 112 include a social network platform circuit 180, a network interface circuit 182, and a member database 184. In some embodiments, the network interface circuit 182 comprises one or more Bluetooth® transceivers, RFID transceivers, NFC transceivers, Wi-Fi transceivers, cellular transceivers, and the like. In some embodiments, the social network platform circuit 180 and/or the member database 184 resides in part on different computing devices or systems (e.g., in the social authentication computing system 110 or the financial institution computing system 108) in relation to other components or to the whole of a particular component. Data passing through the network interface circuit 182 may be encrypted such that the network interface circuit 182 is a secure communication module.

In some embodiments, the social network platform circuit 180 is configured to determine individual social media data that can be used and communicated to a social authentication computing system 110 in order to facilitate payments and transactions using social background checks of members. In some arrangements, the social network platform circuit 180, the network interface circuit 182, and the member database 184 reside in part on different servers in relation to other components or to the whole of a particular component. In some arrangements, parts or all of the social network computing system 112 as described herein runs on or is configured to run on the social authentication computing system 110. In some arrangements, parts or all of the social network computing system 112 runs on or is configured to run on the financial institution computing system 108.

In some embodiments, the social network platform circuit 180 is configured to provide information, including profile information, social network connections, posted information, social following information, indicated likes, indicated dislikes, indicated interests, and other available social network data of individual members to one or more computing systems (e.g., the social syndicate computing system 110). In some arrangements, members can opt in or opt out of participating in the social authentication. In other arrangements, all members are part of the social authentication. In some arrangements, members that are part of the social authentication can control what components of their respective available social network information is available to be used in the social authentication.

In some embodiments, the member database 184 is configured to store information related to account information and/or profiles of members of the social network. In some embodiments, the members can be individual users or business users. In some arrangements, participation in the social authentication is a condition of membership of the social network.

Figure 2:
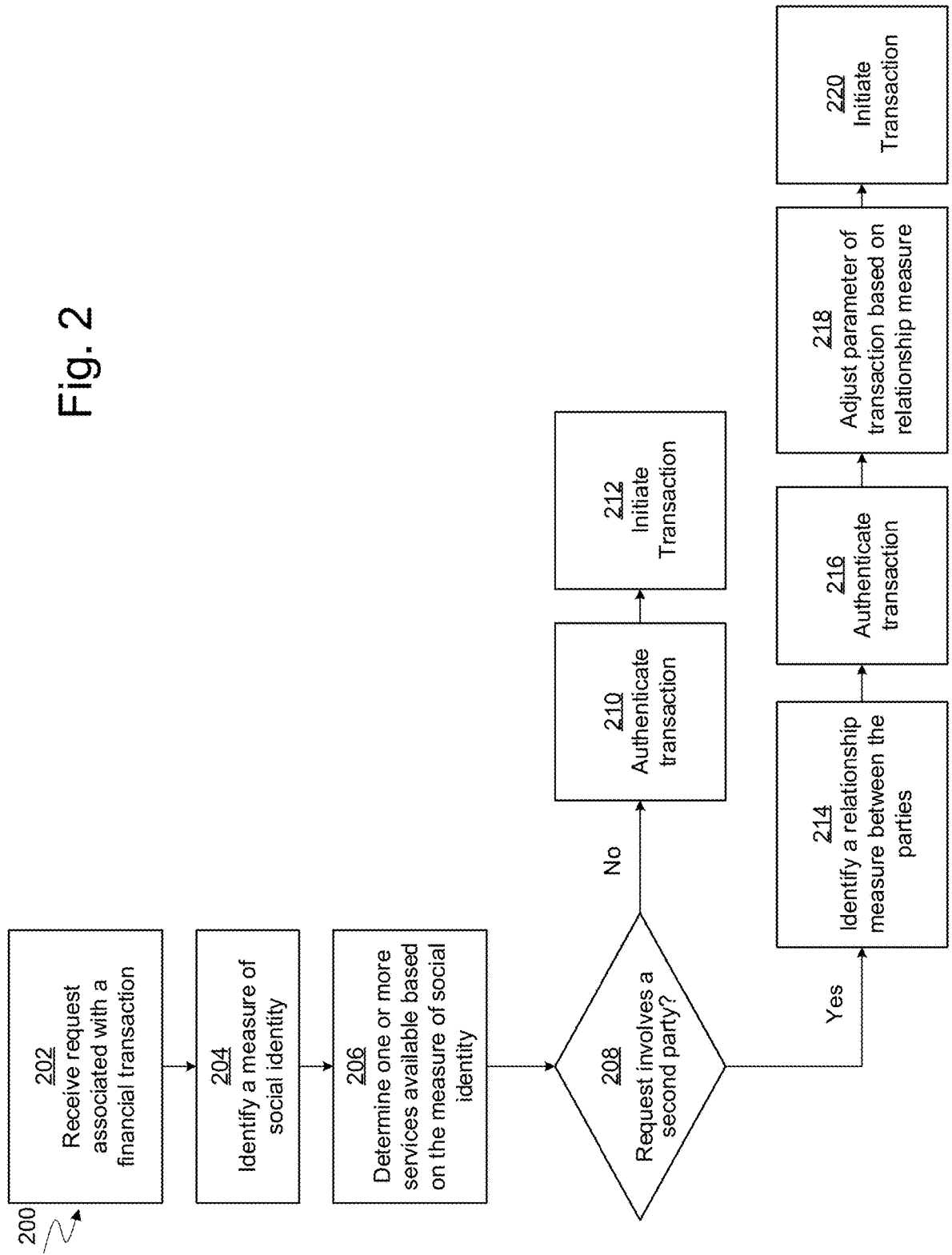
FIG. 2 is a flow diagram of a method of determining and authenticating financial transactions shown according to an example embodiment.

Referring now to FIG. 2, a flow diagram of a method 200 of determining and authenticating financial transaction is shown according to an example embodiment. In some embodiments, the method 200 is performed by the social authentication computing system 110. In some embodiments, one or more steps of the method 200 may be performed by the financial institution computing system 108, a social network computing system 112, and/or an individual computing device 102. In brief, the method 200 comprises receiving a request associated with a financial transaction, identifying a measure of social identity of the requestor, determining that one or more services are available based on the measure of social identity and determining if the request involves a second party. If the request does not involve a second party, the transaction is authenticated and the transaction is initiated. If the request involves a second party, a relationship measure is identified between the two parties, the transaction is authenticated, a parameter of the transaction adjusted based on the relationship measure and the transaction is initiated. The method 200 may be used to generate and display a graphic indicative of available services to a user, the transaction request, a level of authorization required, and successful completion of a request.

Continuing with FIG. 2 and in more detail, the method 200 begins when a request associated with a financial transaction is received at 202. In some embodiments, the request may be received by a social authentication computing system 110 from an individual computing device 102 via the respective network interface circuit 140. In some embodiments, the method 200 may include providing an application for facilitating financial transactions to the individual computing device 102. In some embodiments, the method 200 may include providing software code for execution on a browser running on the individual computing device 102 for facilitating financial transactions. In some embodiments, the request includes information required to access a user's financial accounts (e.g., one or more of account numbers, password, name of financial institution, etc.).

A measure of social identity is identified at 204. In some embodiments, the measure of social identity is a social identity score associated with a user. In some embodiments, the measure of social identity is based on one or more of number and type of transactions on social media platforms, frequency of original posts, articles, videos, etc. by the user, frequency of sharing content of others by the user, number of approval indicators (e.g., 'likes') associated with the user, frequency of accessing content on one or more social media platforms, number of shared connections (e.g., 'friends') of the user, amount of time active on one or more social media platforms, and the like. The data associated with the number and type of transactions may be further validated through confirmation from other data sources. In some embodiments, the data associated with the number and type of social media transactions is validated against public records (e.g., government records, school records, other social media profiles, etc.).

One or more services that are available are determined based on the measure of social identity at 206. In some embodiments, the one or more services that are available are limited based on the measure of social identity. For example, a low social identity score may indicate that the user has a newly opened account on the one or more social media platforms and does not have sufficient history to allow access to the one or more services that are available. In some embodiments, available services include one or more of peer to peer funds transfer, account to account funds transfer, depositing of checks, short term loan applications, and the like.

A determination is made if the request involves a second party at 208. In some embodiments, the request associated with a financial transaction includes identifying information of a second party (e.g., name, associated account information, associated financial institution information, and the like). For example, a financial transaction involving a peer-to-peer transfer of currency will involve a second party that is a recipient of the transfer or the recipient of a request to transfer currency to the requestor.

If there is a determination that the request does not involve a second party, the transaction is authenticated at 210. In some embodiments, the authentication requirements are reduced based on the measure of social identity determined at 204. In some embodiments, authentication is obtained through the use of financial information associated with an account of the party (e.g., a credit card number and expiration date). In some embodiments, additional authentication data is received from one or more sensors of an individual computing device 102 used by the party to initiate the transaction. For example, the additional authentication data may comprise biometric information obtained from the one or more sensors such as a finger print, thumb print, hand print, or any print of the body, facial image obtained by camera components or sensors, an eye image (iris or retina) obtained by camera components or sensors, a vocal sample, captured gait information (e.g., through the use of accelerometers), hand geometry information, thermogram data, skin reflection data, infrared sensor data, etc. In some embodiments, the transaction is authenticated through the use of two-factor authorization through communication with the individual computing device 102. In some embodiments, data is received from a sensor or touchscreen of an individual computing device 102 to facilitate authentication such as a gesture pattern on the individual computing device 102 (i.e., hand pattern, individual computing device 102 movement pattern, keypad entry pattern, etc.), a security image recognizable by the user, a vibrational pattern on the individual computing device 102, and the like. The authentication information is captured by the individual user device 102 or a sensor device connected to the individual user device 102. Any one or a combination of the authentication information described throughout may be used to authenticate the user and/or the transaction.

The transaction is initiated at 212. In some embodiments, initiation of a transaction is an authorization for a financial transaction from one account to a second account (e.g., a transfer of funds, a peer-to-peer transfer of currency, a conversion to foreign currency, and the like). In some arrangements, the financial transaction authorized is a transfer of funds from the account of the sending party to the account of the receiving party. Initiating the transaction begins by removing the funds from the account of the sending party. The transaction completes when the funds are deposited in the account of the receiving party. In some arrangements, the financial transaction authorized is a transfer of funds from an account of a party with the funds transferred to another account of the same party accompanying a foreign currency conversion. Initiating the transaction begins by removing the funds from the first account of the party. The currency is converted to a foreign currency while the funds are not in either one of the accounts. The transaction completes when the funds in the form of the foreign currency are deposited in to the other account of the party.

If there is a determination that the request involves a second party, a relationship measure is identified between the parties at 214. In some embodiments, the relationship measure is based on at least one of a number or type of social media associations between the parties (e.g., posts associated with the other party, tagging of the other party in posts or images, both parties present in the same image or video, invitations to events, sharing of social media content between parties, number of shared connections on one or more social media platforms, etc.). In some embodiments, the relationship measure is a number of social media associations between the parties. In some embodiments, the relationship measure is a number of social media associations between the parties with weighting for certain types of social media associations. In some embodiments, the relationship measure is weighted or further weighted by one or more factors (e.g., a length of time the association has existed on one or more social media platforms, a number of social media platforms where there is an association between the parties, and other associations received between the parties from third party sources of information).

After a relationship measure is identified at 214, the transaction is authenticated at 216. In some embodiments, the authentication requirements are reduced based on the measure of social identity determined at 204. In some embodiments, the authentication requirements are reduced based on the relationship measure identified at 214. In some embodiments, the authentication requirements are reduced based on the previous transaction history between the two or more parties. In some embodiments, a relationship measure that is above a threshold relationship measure determines a level of trust. Different threshold relationship measures may correspond to a different levels of trust and accordingly require decreasing amounts of additional authentication. In some embodiments, the threshold relationship measures may correspond to differing values for a maximum currency amount that can be part of the transaction. In some embodiments, further authentication is obtained through the use of financial information associated with an account of one or more of the parties (e.g., a credit card number and expiration date). In some embodiments, a low relationship measure can be mitigated by additional information accessed about the social media use of the potential receiving party. Additional information may be available to determine a measure of social identity of the receiving party and a threshold level determines the receiving party is not a fake or fraudulent identity.

In some embodiments, additional authentication data is received from one or more sensors of an individual computing device 102 used by the party to initiate the transaction. Additional authentication of the receiving party may also be received from one or more sensors of an individual computing device 102 used by the receiving party. For example, the additional authentication data for either party may comprise biometric information obtained from the one or more sensors such as a finger print, thumb print, hand print, or any print of the body, facial image obtained by camera components or sensors, an eye image (iris or retina) obtained by camera components or sensors, a vocal sample, captured gait information (e.g., through the use of accelerometers), hand geometry information, thermogram data, skin reflection data, infrared sensor data, etc. In some embodiments, the transaction is authenticated through the use of two-factor authorization through communication with one or more individual computing device 102. In some embodiments, data is received from a sensor or touchscreen of one or more individual computing devices 102 to facilitate authentication such as a gesture pattern on the respective individual computing device 102 (i.e., hand pattern, individual computing device 102 movement pattern, keypad entry pattern, etc.), a security image recognizable by the user, a vibrational pattern on the individual computing device 102, and the like. The authentication information is captured by a respective individual user device 102 or a sensor device connected to the respective individual user device 102. Any one or a combination of the authentication information described throughout may be used to authenticate one or more of the parties and/or the transaction.

The parameter of the transaction is adjusted based on the relationship measure at 218. In some embodiments, the parameter is a timing parameter associated with the transaction. For example, the transaction is for a transfer of funds from the initiating party to a receiving party and the timing parameter is adjusted to reduce the amount of time it takes for the funds to be available in an account of the receiving party based on the relationship measure. In some embodiments, access to funds is granted earlier than an amount of time the transaction requires to be complete based on the relationship measure. In other words, the funds are made available to the receiving party immediately although the mechanics of the transfer are still in progress. In some embodiments, the parameter is a level of trust (or conversely a level of fraud) parameter with values indicating various levels of trust associated with the transaction based on one or more of the measure of social identity and the relationship measure between the parties. The level of trust may be associated with various levels of funds that are immediately transferred to the account while the remainder of the funds waits for completion of all portions of the transfer process.

The transaction is initiated at 220. In some embodiments, initiation of a transaction is an authorization for a financial transaction from one account to a second account (e.g., a transfer of funds, a peer-to-peer transfer of currency, a conversion to foreign currency, and the like). In some arrangements, the financial transaction authorized is a transfer of funds from the account of the sending party to the account of the receiving party. Initiating the transaction begins by removing the funds from the account of the sending party. The transaction completes when the funds are deposited in the account of the receiving party. In some arrangements, the financial transaction authorized is a transfer of funds from an account of a party with the funds transferred to another account of the same party accompanying a foreign currency conversion. Initiating the transaction begins by removing the funds from the first account of the party. The currency is converted to a foreign currency while the funds are not in either one of the accounts. The transaction completes when the funds in the form of the foreign currency are deposited in to the other account of the party.

Figure 3:
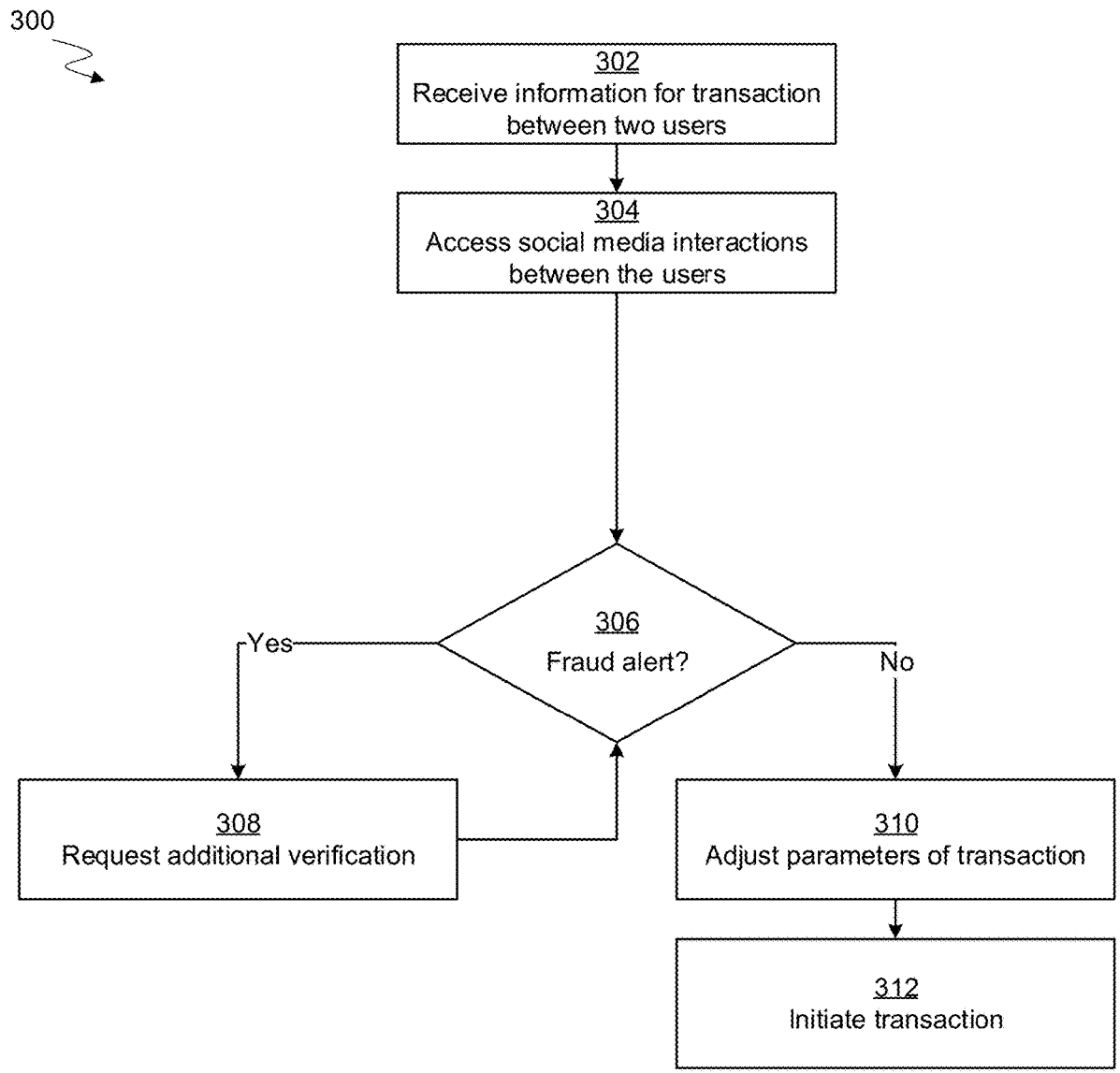
FIG. 3 is a flow diagram of a method of using social media interactions to determine a need for additional verification according to an example embodiment.

Referring now to FIG. 3, a flow diagram of a method 300 of using social media interactions to determine a need for additional verification is shown according to an example embodiment. In some embodiments, the method 300 is performed by the financial institution computing system 108. In some embodiments, one or more steps of the method 300 may be performed by the social authentication computing system 110 and/or an individual computing device 102. In brief, the method 300 comprises receiving information for a transaction between two individuals, accessing the social media interactions between the two users and determining whether there is a fraud alert. If there is a fraud alert, additional verification is requested. If there is not a fraud alert, parameters of the transaction are requested and the transaction is initiated. The method 300 may be used to generate and display a graphic indicative of transaction details on an individual computing device 102 or in association with a social networking profile of the user associated with the transaction.

The method 300 begins when information for a transaction between two individuals is received at 302. In some embodiments, the information for the transaction may be received from an individual computing device 102 via the respective network interface circuit 140 by a financial institution computing system 108. In some embodiments, the method 200 may include providing an application for facilitating financial transactions to the individual computing device 102. In some embodiments, the method 200 may include providing software code for execution on a browser running on the individual computing device 102 for facilitating financial transactions. In some embodiments, the request includes information required to access a user's financial accounts (e.g., one or more of account numbers, password, name of financial institution, etc.).

Social media interactions between the individuals is accessed at 304. In some embodiments, the social media interactions include associations on social media platform such as number and/or frequency of posts initiated by one of the individuals and associated with the other individual, a number and/or frequency of shared media such as posts, articles, videos etc., shared by one individual with the other individual, a number and/or frequency of original posts, articles, videos, etc. by one individual with the other individual, a number and/or frequency of approval indicators (e.g., 'likes') associated with one individual directed to the other individual, a number of shared connections (e.g., 'friends') between the individuals, and the like. In some embodiments, the data associated with the number and/or frequency of social media interactions may be further validated with confirmation from other data sources. In some embodiments, the data associated with the number and/or frequency of social media interactions is validated against stored user profile information of the individual (e.g., location, interests, demographics, etc.).

A determination is made if there is a fraud alert at 306. In some embodiments, a determination is made if there is a threshold of social media interactions required to prevent a fraud alert. In some embodiments, the determinations is based at least on a length of time an account has been open on one or more social media platforms for one or more of the individuals. In some embodiments, there are different levels of fraud alerts (e.g., fraud risk low, requires further investigation, clearly fraudulent, etc.). In some embodiments, one or more levels of fraud alert may allow the transaction to proceed, but limits the amount of money that the transaction can be for if a financial transaction.

If there is a determination that there is a fraud alert at 306, additional verification is requested at 308. In some embodiments, an indication that there has been a fraud alert is sent to an individual computing device 102 for display (e.g., an individual computing device 102 of an initiator of a financial transaction). The indication may be one or more of a text message, a pop-up message, a visual icon, haptic feedback or other tactile indication, an automated voice message, and the like. In some embodiments, the additional verification, once received, is sufficient to move the level of fraud to a level that allows the transaction to proceed. In some embodiments, the additional verification is a confirmation with the individual originating the transaction whether to proceed with the transaction. The confirmation may be a one-time passcode sent to an individual computing device 102 of the individual initiating the transaction to be used in a reply to the confirmation, a text message sent requiring a response, and the like. The confirmation may include information on why the transaction is triggering a fraud alert level. In some embodiments, further verification is obtained by analyzing the social media interactions of the receiving individual.

In some embodiments, a fraud alert is triggered by a change in one or more identifying parameters used in a transaction (e.g., a phone number used to identify a recipient in a peer to peer monetary transfer). In one example, in the embodiment, the token to identify the recipient is still valid, but the phone number used has been changed. Additional verification may comprise confirming the new phone number is associated with the recipient (e.g., by requesting additional verification information using the new phone number, by consulting a database identifying the new phone number to one of the old phone number or the recipient, and the like).

If there is a determination that there is no fraud alert at 306, the parameters of the transaction are adjusted at 310. In some embodiments, the level of fraud alert must be at a level sufficient for the transaction to go forward. In some embodiments, the value of the parameter is based on the level of fraud alert. The parameters of the transaction may affect a timing of the transaction (e.g., a low level of fraud alert is granted a faster transaction speed, a low level of fraud alert allows the receiver of a financial transaction comprising funds transfer has the funds become accessible prior to completion of the transfer, and the like). Other parameters of the transaction that may be adjusted, including maximum transfer limits, fees, currency exchange rates, availability of funds transfer to other financial institutions, and the like.

The transaction is initiated at 312. In some embodiments, initiation of a transaction is an authorization for a financial transaction from one account to a second account (e.g., a transfer of funds, a peer-to-peer transfer of currency, a conversion to foreign currency, and the like). In some arrangements, the financial transaction authorized is a transfer of funds from the account of the sending party to the account of the receiving party. Initiating the transaction begins by removing the funds from the account of the sending party. The transaction completes when the funds are deposited in the account of the receiving party. In some arrangements, the financial transaction authorized is a transfer of funds from an account of a party with the funds transferred to another account of the same party accompanying a foreign currency conversion. Initiating the transaction begins by removing the funds from the first account of the party. The currency is converted to a foreign currency while the funds are not in either one of the accounts. The transaction completes when the funds in the form of the foreign currency are deposited in to the other account of the party.

Figure 4:
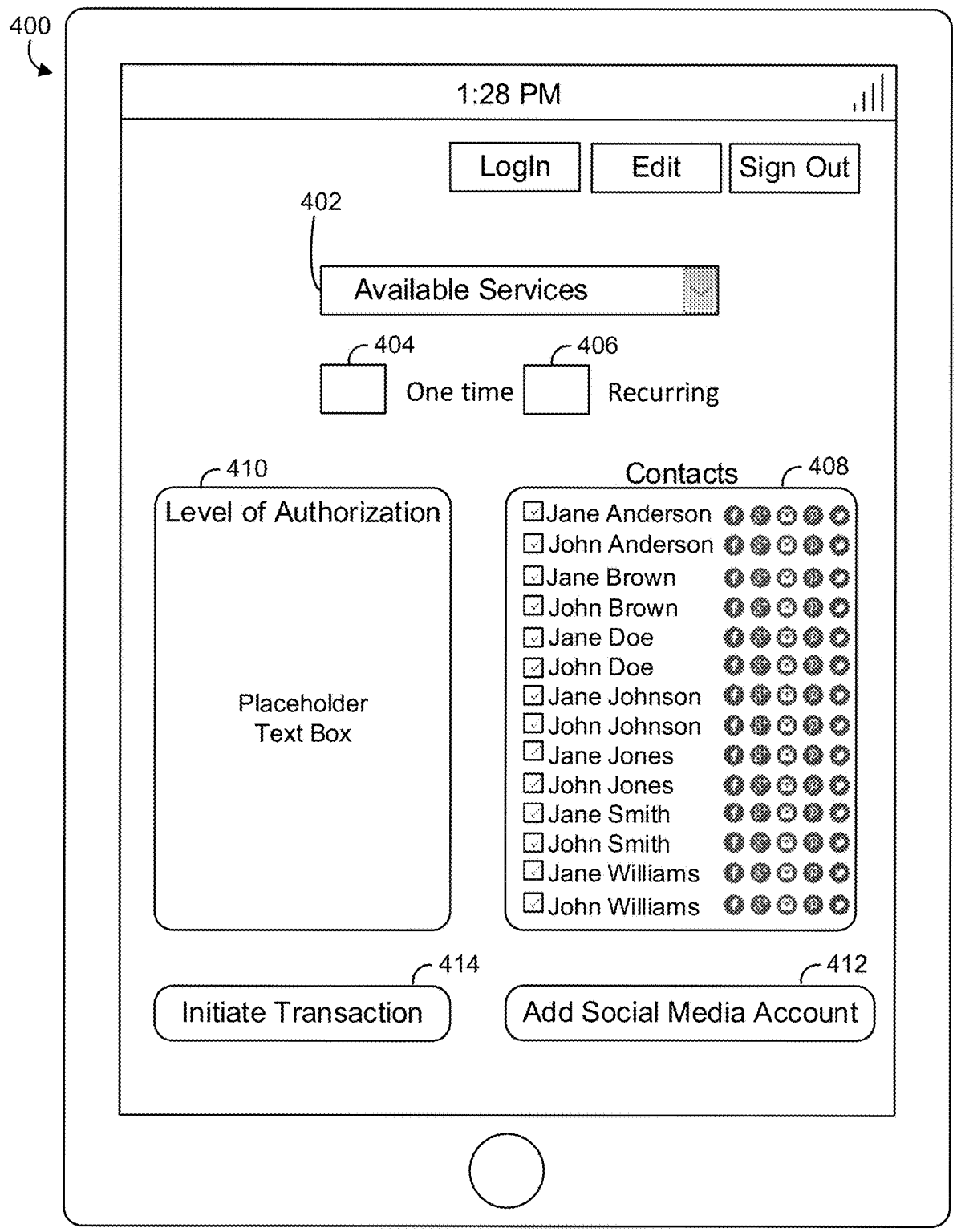
FIG. 4 is an interface on a display of an individual computing device including graphics displaying transaction options shown according to an example embodiment.

Referring now to FIG. 4, an interface 400 on a display of an individual computing device 102, including graphics displaying transaction options, is shown according to an example embodiment. In brief, the interface 400 (which may be on a display of an individual computing device 102) includes a pull-down menu of available services 402. The pull-down menu of available services 402 includes one or more available selections corresponding to various services (e.g. financial transactions) that can be performed. The interface 400 also shows menu options including user-selectable button icons corresponding to the frequency of the transaction, either one time 404 or recurring 406. In the embodiment shown, the display of the individual computing device 102 also includes a level of authorization display 410, a list of contacts 408, which includes the social media icons for connected social media networks, an add social media account button 412, and an initiate transaction button 414.

Still referring to FIG. 4 and in further detail, the interface 400 includes a pull-down menu of available services 402. In some embodiments, only the services available to the individual logged in to the individual computing device 102 can be seen in the pull down menu. In some embodiments, all the services that are available can be seen in the pull down menu but unavailable services are inaccessible (e.g., grayed out). In some embodiments, available services include financial transactions involving a transfer of funds to another party, a transfer of funds to an account, a foreign currency exchange, an application for a short term loan, and the like.

The interface 400 includes user-selectable button icons corresponding to the frequency of the transaction, either one time 404 or recurring 406. In some embodiments, available services include transfer of funds services which include options for a one-time 404 transfer or a recurring 406 transfer. In some embodiments, a one-time 404 transfer require a different trust level before initiating the transfer than a recurring 406 transfer. Other factors changing the required trust level or level of authorization required may include whether a recurring 406 transfer has already been in place and completed successfully.

The interface 400 includes a list of contacts 408. In some embodiments, the list of contacts displays a list of contacts from one or more social media platforms available to initiate an available service with. In some embodiments, contacts in the list of contacts are a sub-group of a total lit of contacts from one or more social media platforms that have been selected to be available for selection for the available services and transactions (e.g., a payment circle). In some embodiments, one or more of the contacts is selectable using a checkbox next to the contact in the list of contacts 408. In some embodiments, a graphic indicator displays one or more of the social media platforms through which the user has a connection to the respective contact. In some embodiment, selection of one or more of the contacts determines what results are available in other portions of the interface 400 (e.g., what services are available in the pull down menu of available services 402, what is displayed in the level of authorization display 410, whether the initiate transaction button 414 is active, etc.).

The interface 400 includes a level of authorization display 410. In some embodiments, the level of authorization display 410 displays an indication of a limit of any parameters associated with the chosen transaction or service. The display may change depending on which of one or more contacts are selected in the list of contacts 408. In some embodiments, the level of authorization display 410 displays an indication of what additional verification needs to be completed to allow for the successful completion of the chosen transaction or service. In some embodiments, the level of authorization display 410 displays whether the transaction or service is now authorized to proceed The interface 400 includes an add social media account button 412. In some embodiments, the add social media account button 412 allows a user to add or import contacts from a social media account that is not yet accessible by the interface 400. In some embodiments, the user is able to log in to the new social media account and information from the social media platform associated with the new social media account is added to the interface 400. In some embodiments, the user is able to control which contacts from the new social media account are added to the interface 400. The list of contacts 408 may be updated with a new graphical icon to indicate the new social media platform that has been accessed.

The interface 400 includes an initiate transaction button 414. In some embodiments, the initiate transaction button 414 is not active (e.g., grayed out) until all required selections have been made and any additional verification data has been received. In some embodiments, the initiate transaction button 414 may be active and the user is informed by the interface 400 that the transaction is being processed, but will not be initiated until some required additional verification data has been received.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web embodiments of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A computer-implemented method performed by a computing system, the method comprising:
receiving a request for a transaction from a first party to a second party;
receiving a plurality of social media associations between the first party and the second party;
determining a relationship measure based on a number of the plurality of social media associations; and
weighting the relationship measure by a factor corresponding to at least some of the plurality of social media associations between the first party and the second party;
comparing the weighted relationship measure to one or more threshold relationship measures to select an authentication requirement from a plurality of authentication requirements for completion of the transaction, wherein the one or more threshold relationship measures correspond to a respective level of trust between the first party and the second party;
receiving, from one or more sensors of a computing device corresponding to one of the first party or the second party, authentication data corresponding to the selected authentication requirement;
authenticating, using the authentication data from the one or more sensors, the first party or the second party; and
initiating the transaction from the first party to the second party responsive to authenticating the first party or the second party.

2. The method of claim 1, further comprising:
adjusting a parameter associated with the transaction based on the relationship measure exceeding a threshold value, wherein the adjusted parameter comprises at least one of a timing parameter associated with an amount of time for making funds available in an account corresponding to the second party, or a level of funds parameters associated with an amount of funds made available to the account corresponding to the second party.

3. The method of claim 2, wherein the transaction is initiated using the adjusted parameter.

4. The method of claim 2, wherein the adjusted parameter is selected from a group comprising a time of completion of the transaction, a value of funds authorized for the transaction, a fee associated with the transaction, and an exchange rate associated with the transaction.

5. The method of claim 1, wherein the factor is selected from a group comprising a value associated with one or more of a type of the plurality of social media associations, a frequency of the plurality of social media associations, a length of time the first party and the second party have been associated on one or more social media platforms, and a number of shared connections between the first party and the second party.

6. The method of claim 1, further comprising:
determining a social identity score for the first party based on at least a number and a type of social media content created by the first party;
determining availability of a type of the transaction received in the request; and
transmitting, to a computing device of the first party, a confirmation of the availability of the type of the transaction based on the social identity score for the first party.

7. The method of claim 1, further comprising determining the relationship measure does not exceed a second threshold value and transmitting a request for additional authentication based on the relationship measure not exceeding the second threshold value.

8. The method of claim 7, wherein the request for additional authentication is at least one of a request for biometric information, a two-factor authorization request, a gesture pattern request, a security image request, a request for data selected from a group comprising financial information associated with an account of the first party, financial information associated with an account of the second party, a social identity score of the second party, or additional data from the one or more sensors of a computing device.

9. A system comprising:
a network interface circuit configured for:
receiving a request for a transaction from a first party to a second party;
receiving a plurality of social media associations between the first party and the second party; and
a financial transaction circuit configured for:
determining a relationship measure between the first party and the second party based on a number of the plurality of social media associations;
weighting the relationship measure by a factor corresponding to at least some of the plurality of social media associations between the first party and the second party;
comparing the weighted relationship measure to one or more threshold relationship measures to select an authentication requirement from a plurality of authentication requirements for completion of the transaction, wherein the one or more threshold relationship measures correspond to a respective level of trust between the first party and the second party;
receiving, from one or more sensors of a computing device corresponding to one of the first party or the second party, authentication data corresponding to the selected authentication requirement;
authenticating, using the authentication data from the one or more sensors, the first party or the second party; and
initiating the transaction from the first party to the second party responsive to authenticating the first party or the second party.

10. The system of claim 9, the financial transaction circuit further configured for:
adjusting a parameter associated with the transaction based on the relationship measure exceeding a threshold value, wherein the adjusted parameter comprises at least one of a timing parameter associated with an amount of time for making funds available in an account corresponding to the second party, or a level of funds parameters associated with an amount of funds made available to the account corresponding to the second party, and wherein the transaction is initiated using the adjusted parameter.

11. The system of claim 10, wherein the adjusted parameter is selected from a group comprising a time of completion of the transaction, a value of funds authorized for the transaction, a fee associated with the transaction, and an exchange rate associated with the transaction.

12. The system of claim 9, wherein the factor is selected from a group comprising a value associated with one or more of a type of the plurality of social media associations, a frequency of the plurality of social media associations, a length of time the first party and the second party have been associated on one or more social media platforms, and a number of shared connections between the first party and the second party.

13. The system of claim 9, the financial transaction circuit further configured for:
   determining a social identity score for the first party based on at least a number and a type of social media content created by the first party;
   determining availability of a type of the transaction received in the request; and
   transmitting, to a computing device of the first party, a confirmation of the availability of the type of the transaction based on the social identity score for the first party.

14. The system of claim 9, the financial transaction circuit further configured for:
   determining the relationship measure does not exceed a second threshold value and transmitting a request for additional authentication based on the relationship measure not exceeding the second threshold value;
   wherein the request for additional authentication is at least one of a request for biometric information, a two-factor authorization request, a gesture pattern request, a security image request, a request for data selected from a group comprising financial information associated with an account of the first party, financial information associated with an account of the second party, a social identity score of the second party, or additional data from the one or more sensors of a computing device.

15. A non-transitory computer-readable media having computer-executable instructions embodied therein that, when executed by one or more processors of a computing system, cause the one or more processors to perform operations, the operations comprising:
   receiving a request for a transaction from a first party to a second party; and
   receiving a plurality of social media associations between the first party and the second party;
   determining a relationship measure based on a number of the plurality of social media associations;
   weighting the relationship measure by a factor corresponding to at least some of the plurality of social media associations between the first party and the second party;
   comparing the weighted relationship measure to one or more threshold relationship measures to select an authentication requirement from a plurality of authentication requirements for completion of the transaction, wherein the one or more threshold relationship measures correspond to a respective level of trust between the first party and the second party;
   receiving, from one or more sensors of a computing device corresponding to one of the first party or the second party, authentication data corresponding to the selected authentication requirement;
   authenticating, using the authentication data from the one or more sensors, the first party or the second party; and
   initiating the transaction from the first party to the second party responsive to authenticating the first party or the second party.

16. The non-transitory computer-readable media of claim 15, wherein the computer-executable instructions cause the one or more processors to further perform operations comprising:
   adjusting a parameter associated with the transaction based on the relationship measure exceeding a threshold value, wherein the adjusted parameter comprises at least one of a timing parameter associated with an amount of time for making funds available in an account corresponding to the second party, or a level of funds parameters associated with an amount of funds made available to the account corresponding to the second party, and wherein the transaction is initiated using the adjusted parameter.

17. The non-transitory computer-readable media of claim 16, wherein the adjusted parameter is selected from a group comprising a time of completion of the transaction, a value of funds authorized for the transaction, a fee associated with the transaction, and an exchange rate associated with the transaction.

18. The non-transitory computer-readable media of claim 15, wherein the factor is selected from a group comprising a value associated with one or more of a type of the plurality of social media associations, a frequency of the plurality of social media associations, a length of time the first party and the second party have been associated on one or more social media platforms, and a number of shared connections between the first party and the second party.

19. The non-transitory computer-readable media of claim 15, wherein the computer-executable instructions cause the one or more processors to further perform operations comprising:
   determining a social identity score for the first party based on at least a number and a type of social media content created by the first party;
   determining availability of a type of the transaction received in the request; and
   transmitting, to a computing device of the first party, a confirmation of the availability of the type of the transaction based on the social identity score for the first party.

20. The non-transitory computer-readable media of claim 15, wherein the computer-executable instructions cause the one or more processors to further perform operations comprising:
   determining the relationship measure does not exceed a second threshold value and transmitting a request for additional authentication based on the relationship measure not exceeding the second threshold value;
   wherein the request for additional authentication is at least one of a request for biometric information, a two-factor authorization request, a gesture pattern request, a security image request, a request for data selected from a group comprising financial information associated with an account of the first party, financial information associated with an account of the second party, a social identity score of the second party, or additional data from the one or more sensors of a computing device.

* * * * *